(12) United States Patent
Chee

(10) Patent No.: US 10,604,204 B2
(45) Date of Patent: Mar. 31, 2020

(54) BICYCLE SADDLE BAG

(71) Applicant: Howe Shien Chee, Allen, TX (US)

(72) Inventor: Howe Shien Chee, Allen, TX (US)

( * ) Notice: Subject to any disclaimer, the term of this patent is extended or adjusted under 35 U.S.C. 154(b) by 0 days.

(21) Appl. No.: 16/147,697

(22) Filed: Sep. 29, 2018

(65) Prior Publication Data

US 2019/0100266 A1 Apr. 4, 2019

Related U.S. Application Data

(60) Provisional application No. 62/646,760, filed on Mar. 22, 2018, provisional application No. 62/566,076, filed on Sep. 29, 2017.

(51) Int. Cl.
*B62J 9/00* (2006.01)
*B62J 11/00* (2020.01)

(52) U.S. Cl.
CPC .............. *B62J 9/006* (2013.01); *B62J 11/00* (2013.01)

(58) Field of Classification Search
CPC ..... B62J 9/006; B62J 11/00; B62J 7/04; B62J 9/00; B62J 9/001; B62K 19/46
USPC ........................................................ 224/427
See application file for complete search history.

(56) References Cited

U.S. PATENT DOCUMENTS

| | | | |
|---|---|---|---|
| 4,566,617 A * | 1/1986 | Jackson | B62J 9/006 224/275 |
| 4,643,343 A * | 2/1987 | Goldman | B62J 9/006 224/275 |
| 5,127,563 A | 7/1992 | Chan et al. | |
| 5,245,517 A * | 9/1993 | Fenton | A45C 15/06 224/427 |
| 5,356,058 A * | 10/1994 | Fenton | B62J 9/006 224/275 |
| 5,496,089 A | 3/1996 | Murderlack | |
| 5,573,163 A * | 11/1996 | Lee | B62J 9/006 224/427 |
| 5,772,166 A | 6/1998 | Adams | |
| 5,878,930 A * | 3/1999 | Schwimmer | B62J 9/006 224/275 |
| 5,893,501 A | 4/1999 | Schwimmer | |
| D444,447 S | 7/2001 | Russell et al. | |
| 7,712,827 B2 | 5/2010 | Yu | |
| 8,720,759 B1 | 5/2014 | Henderson | |
| 2007/0068986 A1* | 3/2007 | Lien | B62J 9/006 224/427 |
| 2009/0039127 A1 | 2/2009 | Dacko | |
| 2010/0006720 A1* | 1/2010 | Chien-Ping | B62J 9/006 248/201 |
| 2010/0059564 A1 | 3/2010 | Bretl | |
| 2013/0207423 A1 | 8/2013 | Russell | |

FOREIGN PATENT DOCUMENTS

CN 203473080 U 3/2014
DE 202007004583 U1 8/2007

* cited by examiner

*Primary Examiner* — Adam J Waggenspack
(74) *Attorney, Agent, or Firm* — Tompkins PC; George M. Tompkins

(57) ABSTRACT

A removable saddle bag assembly for a bicycle saddle with saddle rails comprising: a saddle bag frame with a central stem configured to fit between the saddle rails, attachment means connected to the central stem and configured to engage the saddle rails, and support arms extending generally rearwardly from the central stem; and a shell substantially surrounding saddle bag frame and defining a storage cavity.

9 Claims, 6 Drawing Sheets

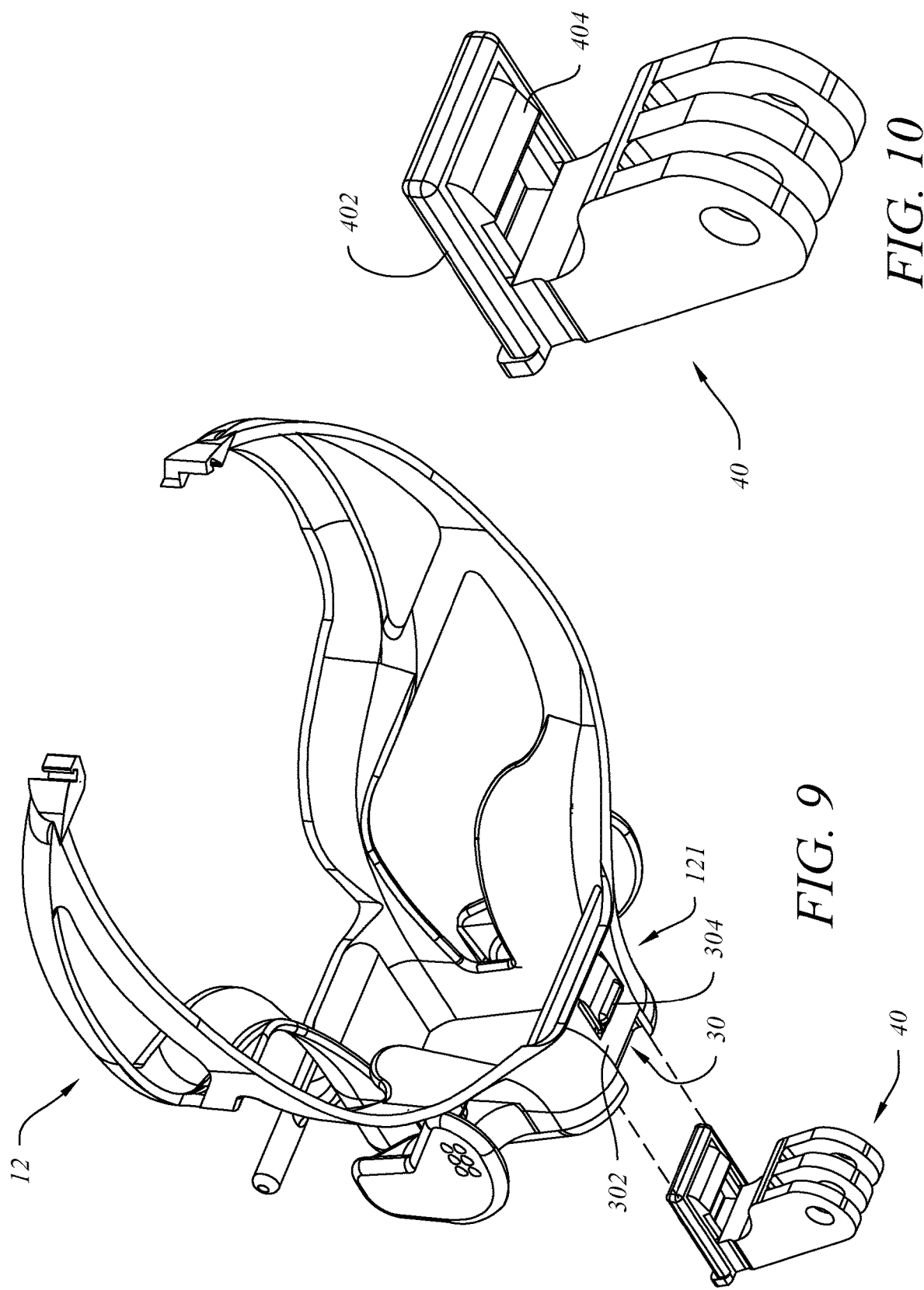

BICYCLE SADDLE BAG

PRIORITY CLAIMS

This application claims the benefit of U.S. Provisional Application Ser. No. 62/566,076, filed Sep. 29, 2017, and 62/646,760, filed Mar. 22, 2018, both of which are hereby incorporated by reference.

TECHNICAL FIELD OF THE INVENTION

The present invention is generally directed to saddle bags and accessory attachments for bicycles and similar vehicles.

BACKGROUND

In competitive and recreational cycling it is often desired to carry a few small items such as tools, patch kits, spare tubes, and the like, in case of a mishap or malfunction during a ride. These items are preferably carried in a storage container attached to the bicycle. Most preferably, the storage container is small, lightweight, easily attachable and removable, and is located substantially within the existing dimensions of the bicycle.

While many bicycle storage options have been used, none meet all of the desired criteria. For example, some prior art storage containers require tools and/or significant effort for attachment and removal from a bicycle. Other prior art designs must extend significantly beyond the bicycle in order to accommodate the items to be stored. This can lead to aerodynamic problems and is aesthetically undesirable. Other designs are adapted to only a specific model of bicycle or bicycle saddle and, therefore, cannot be easily transferred to another bicycle.

SUMMARY

The invention disclosed herein includes a removable saddle bag assembly for a bicycle saddle with saddle rails, the removable saddle bag assembly comprising: a saddle bag frame with a central stem configured to fit between the saddle rails, first and second attachment means connected to the central stem and configured to engage the saddle rails, and first and second support arms connected to the central stem and extending generally rearwardly therefrom, wherein the first and second support arms are semi-rigid; a saddle bag shell substantially surrounding the central stem and support arms and defining a storage cavity; and a selectively closable access port defined in the saddle bag shell.

In one embodiment of the invention the first and second attachment means each comprise a rail engagement spring configured to provide an upward force against the saddle rails when attached to a saddle.

In another embodiment the removable saddle bag assembly comprises a stabilizer bar extending upwardly and forwardly from the central stem and configured to contact a bottom surface of the saddle when the saddle bag assembly is attached to a saddle.

In another embodiment the removable saddle bag comprises an accessory port defined in the central stem, wherein the accessory port is configured to engage an accessory tab and comprises a latch mechanism to selectively secure or release the accessory tab.

In another embodiment the first and second support arms each comprise a latch mechanism on their respective rearward ends and the latch mechanisms are configured to selectively hold the rearward end of the first and second support arms together.

BRIEF DESCRIPTION OF THE DRAWINGS

FIG. 9 is an exploded, perspective view showing how the frame and accessory attachment engage.

FIG. 10 is a perspective view of an accessory attachment.

DETAILED DESCRIPTION OF THE PREFERRED EMBODIMENTS

Figure 1:
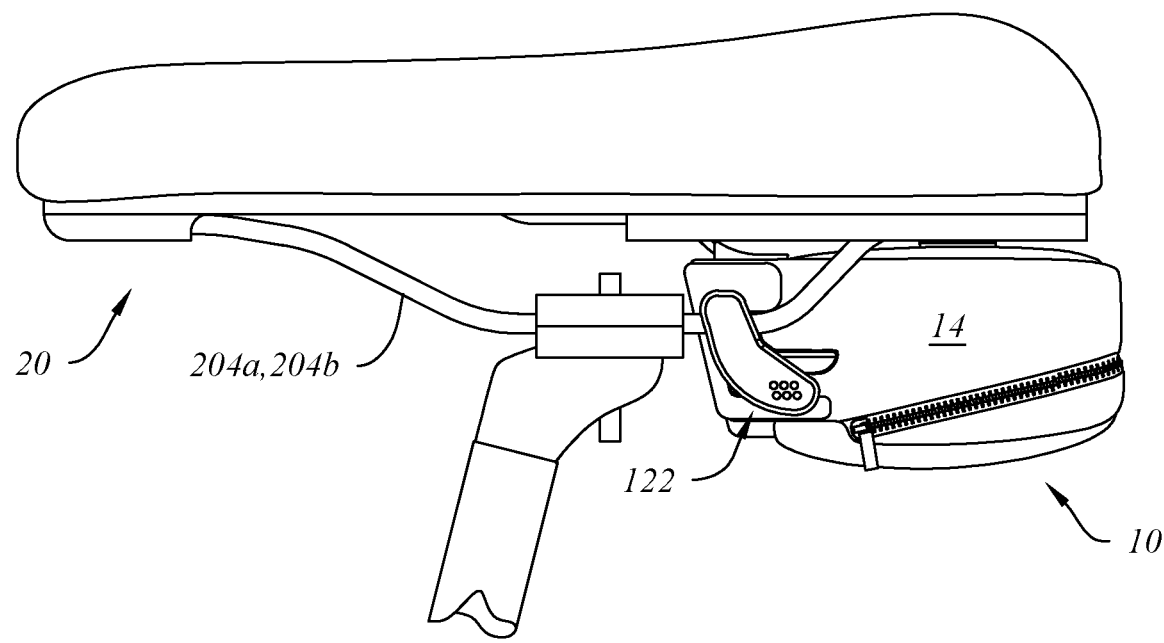
FIG. 1 is a left side view of the preferred embodiment attached to the underside of a bicycle saddle.
Figure 2:
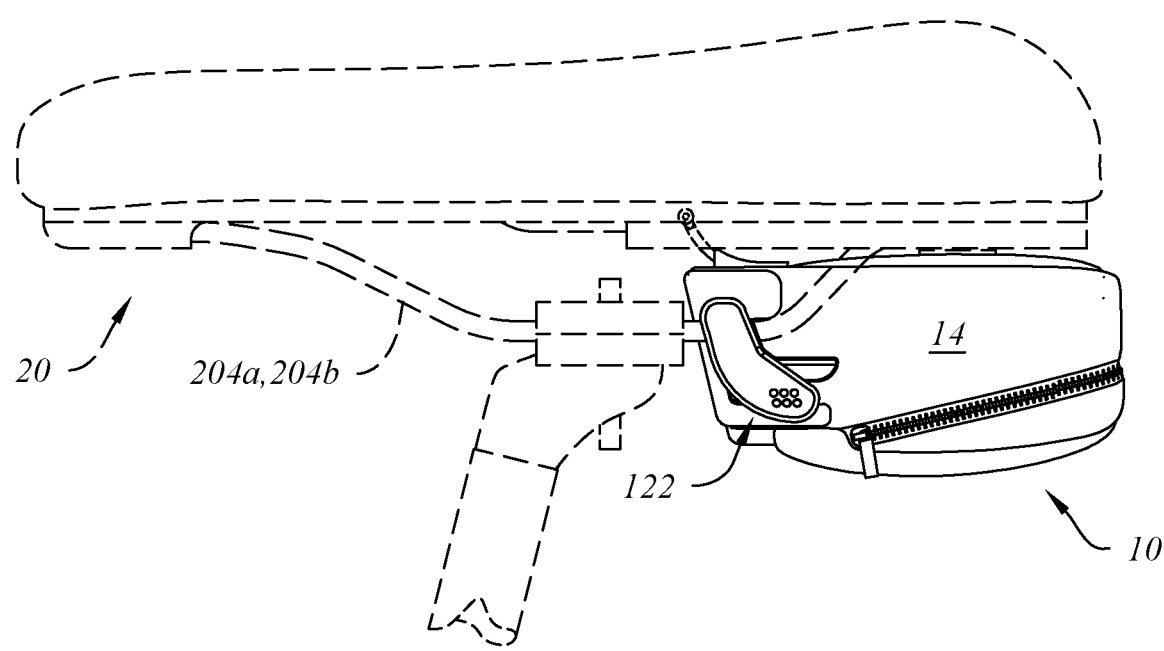
FIG. 2 is a left side view with the bicycle saddle in broken lines.

FIGS. 1 and 2 illustrate an under-saddle bag attached to a saddle 20 of a bicycle or similar vehicle. Container 10 preferably comprises an attachment means 122 configured to attach container 10 to saddle rails 204a and 204b, and a container shell 14 extending rearwardly and/or forwardly from attachment means 122. Attachment means 122 is a part of, or is connected to, a frame 12 (discussed in detail below).

Figure 3:
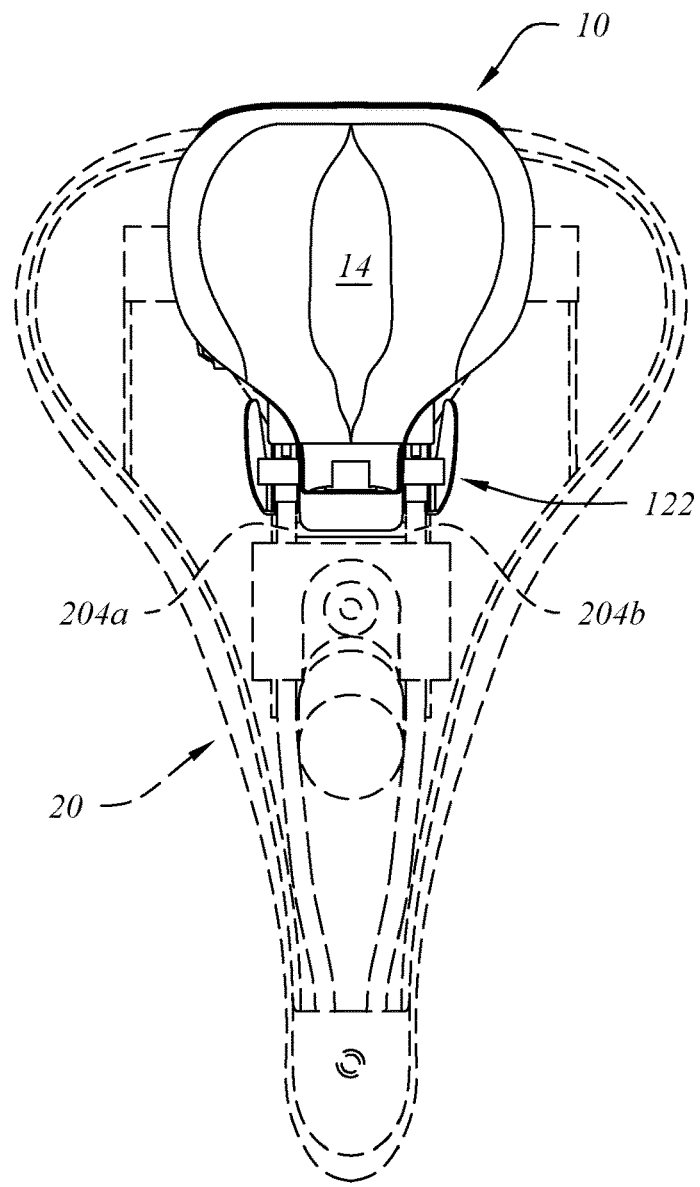
FIG. 3 is a bottom view of the invention attached to the bicycle saddle, which is in broken lines.

FIG. 3 is a bottom view of container 10 and saddle 20. As illustrated, container 10 is preferably wider in back and narrower near attachment means 122. A forward portion of container 10 is preferably sufficiently narrow to fit between saddle rails 204a and 204b so that, when attached to a saddle 20, a portion of container 10 can extend into the area below the saddle 20 and above saddle rails 204a, 204b. This allows container 10 to hold additional cargo, particularly longer objects, without extending too far behind saddle 20.

Figure 4:
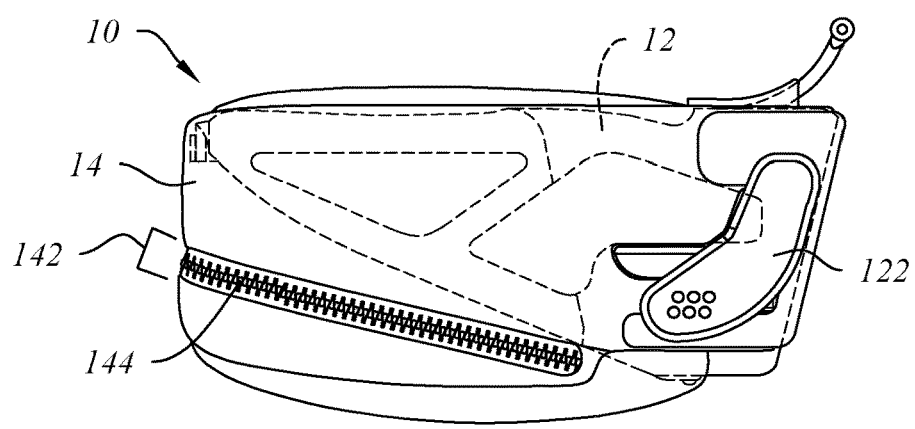
FIG. 4 is a right side view of the preferred embodiment.

FIG. 4 is a side view of container 10 without saddle 20. As seen in FIG. 4, container 10 preferably comprises frame 12 (shown in dashed lines), which is connected to and extends generally rearwardly from attachment means 122. Frame 12 is composed of a rigid or semi-rigid material, such as plastic, metal, or a composite, to maintain the desired shape and location of container 10. In use, frame 12 is substantially surrounded by shell 14, which defines an enclosure for containing items (not shown) within container 10. Shell 14 is preferably composed of a durable, flexible material, such as nylon fabric. Shell 14 comprises a portal 142 for inserting and removing items from container 10 and a closing means 144. The closing means 144 illustrated in FIG. 4 is a zipper, however, many other closing means are known and can be used such as hook and loop fastener, magnetic fasteners, spring hinges, latches, snaps, buttons, and the like.

Figure 5:
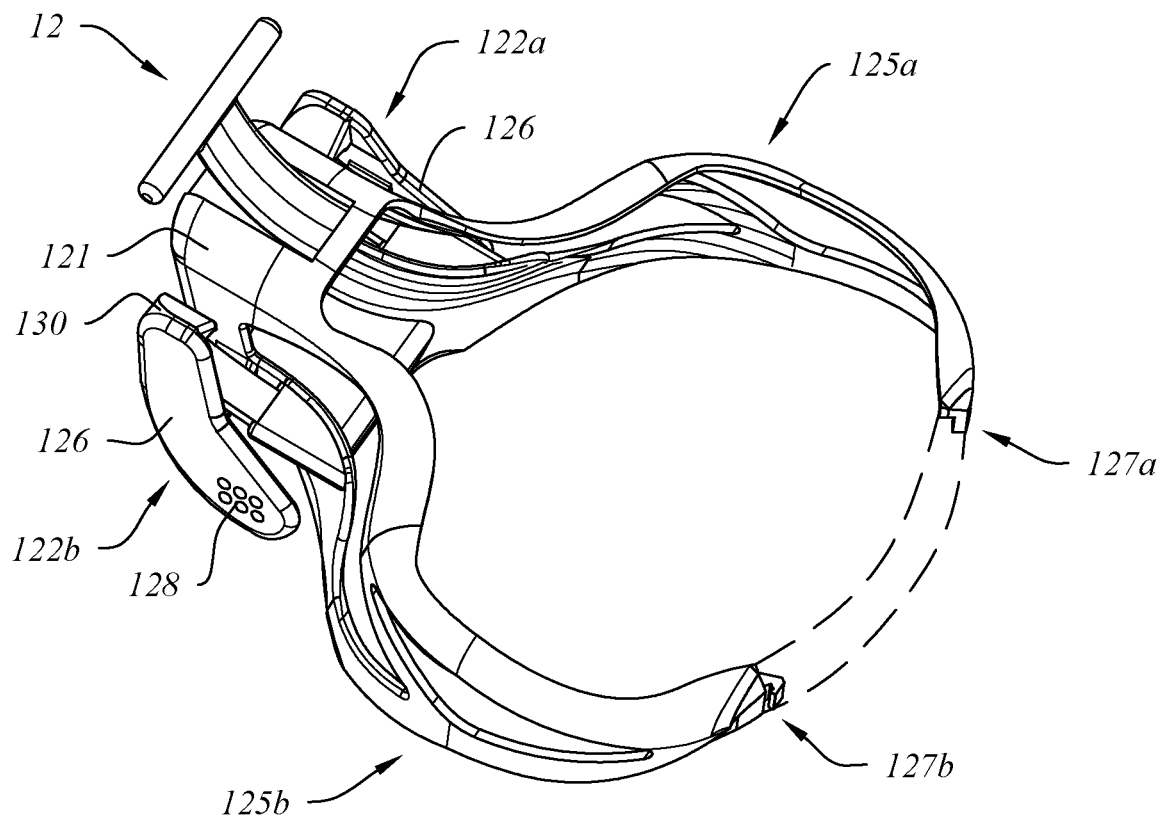
FIG. 5 is a perspective view of the frame.
Figure 6:
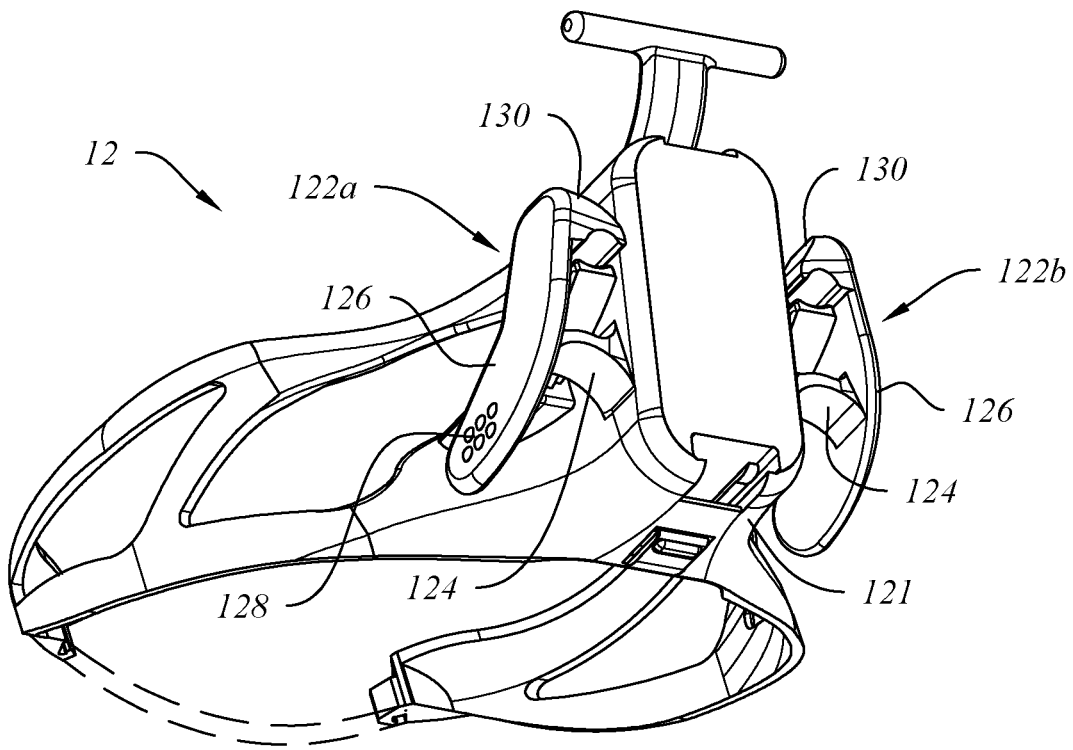
FIG. 6 is a perspective view of the frame.

FIG. 5 is a perspective view of frame 12 taken from above and FIG. 6 is a perspective view of frame 12 taken from below. Frame 12 comprises a central stem 121 that is sufficiently narrow to fit between at least a portion of saddle rails 204a, 204b, (see FIG. 3 and FIG. 11). Attachment means 122a and/or 122b is/are connected to one or both sides of central stem 121 and is/are configured to provide a secure yet removable attachment to saddle rails 204a and/or 204b. Preferably, frame 12 comprises two attachment means 122a and 122b each of which is connected to one side of central stem 121 and is configured to attach to one of the two saddle rails 204a and 204b. The attachment means 122a, and 122b are preferably formed as a single unit with frame 12.

Figure 7:
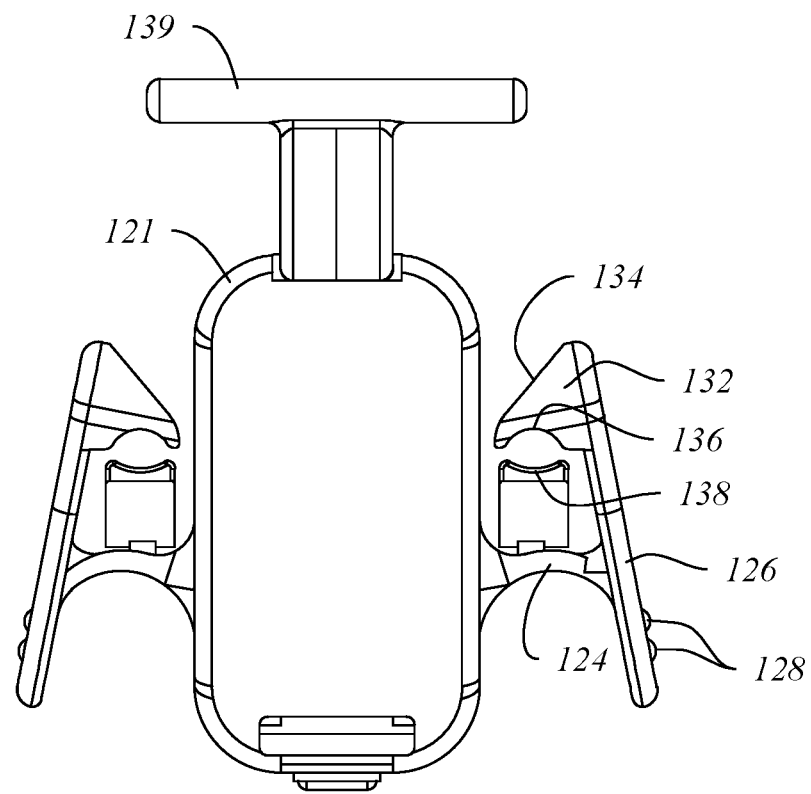
FIG. 7 is a front view of the central stem and attachment means.

FIG. 7 illustrates central stem 121 and attachment means 122 in more detail. Attachment means 122 comprise a spring bridge 124 extending from central stem 121 to a clip paddle 126. Spring bridge 124 is configured in a shape, such as a thin arch, that allows it to flex while also biasing an upper end of clip paddle 126 toward central stem 121. Alternative configurations for connecting and biasing attachment means 122 can be used, such as connecting attachment means 122 to central stem 121 through a hinge and providing a spring member.

A finger/thumb pad 128 is defined near a lower end of clip paddle 126 to provide improved grip. An attachment prong 132 is defined near the upper end of clip paddle 126 on the side of the clip paddle 126 facing central stem 121. An upper surface 134 of attachment prong 132 is preferably sloped to facilitate clipping to saddle rails 204a and 204b. A lower surface 136 of attachment prong 134 is preferably concave to facilitate a stable connection to saddle rails 204a and 204b. The lower surface 136 can also be provided with a high-friction surface, such as a rubberized pad, to further enhance connection stability. Attachment means 122 further comprises rail engagement springs 138, which are positioned and configured to provide an upward force against saddle rails 204a, 204b, tending to hold saddle rails 204a, 204b against attachment prongs 132. Rail engagement springs 138 help to provide a secure connection with the saddle rails 204a, 204b regardless of the rail diameter.

Frame 12 also comprises stabilizer bar 139. Stabilizer bar 139 extends forwardly and upwardly from central stem 121 and is configured to contact the underside of saddle 20 to counteract any tendency of container 10 to rotate when a load is acting on frame 12. Contact between stabilizer bar 139 and saddle 20 also provides guidance during installation. Stabilizer bar 139 is preferably integrally-formed with frame 12.

Referring again to FIGS. 5 & 6, frame 12 further comprises left frame arm 125a and right frame arm 125b extending from central hub 121. Preferably, left frame arm 125a and right frame arm 125b each comprise a hook 127a, 127b defined at the respective distal ends and configured to selectively engage one another to confine the distal ends of left frame arm 125a and right frame arm 125b together. The optional connection between hooks 127a and 127b allows frame 12 to be used with a smaller shell 14 when less storage space is needed.

Figure 8:
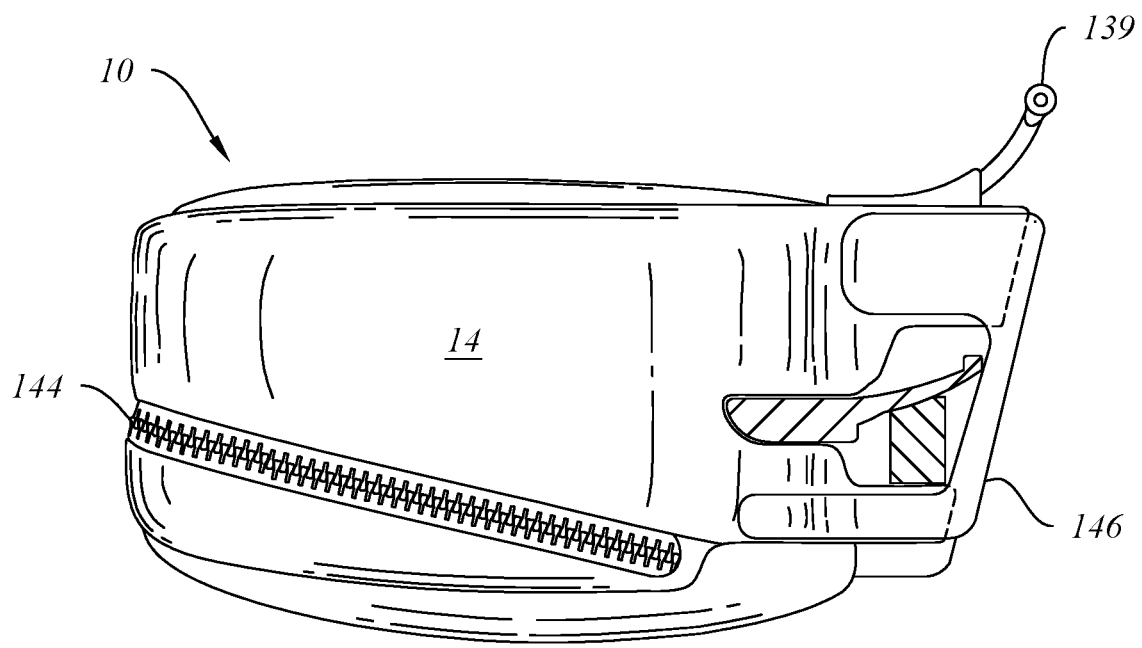
FIG. 8 is a right side view with the attachment means removed.

Referring to FIG. 8, front cover 146 is configured to extend around a forward end of central stem 121, from one side of shell 14 to the other. Front cover 146 preferably comprises hook and loop fastening pads, which engage hook and loop fastening on both sides of shell 14 to help secure shell 14 in a desired position.

Referring to FIGS. 9 and 10, an accessory port 30 is defined on central stem 121. Accessory port 30 comprises accessory channel 302 and accessory latch 304. An accessory adaptor 40 comprises an attachment tab 402 that is configured to slidably engage accessory channel 302. A latch tab 404 engages accessory latch 304 to selectively secure accessory adaptor 40 to accessory port 30. The example accessory adaptor 40 shown in FIGS. 9 and 10 is a mount for a small camera such as a GoPro. However, the accessory port 30 and accessory adaptor 40 could be used for mounting any of a wide variety of accessories such as lights, tools, and GPS trackers.

Figure 11:
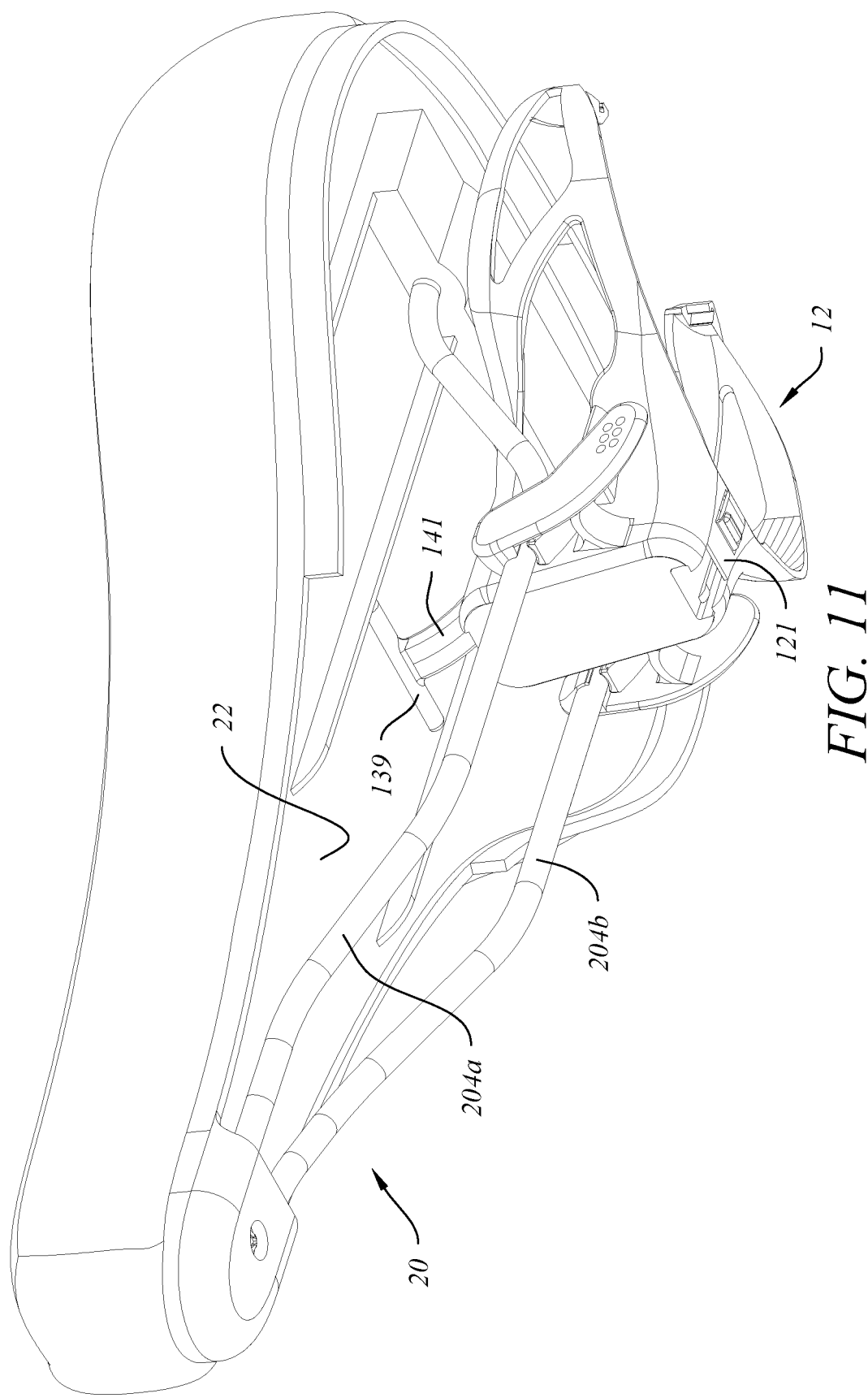
FIG. 11 is a perspective view of the frame and bicycle saddle.

FIG. 11 illustrates the underside of saddle 20 where frame 12 attaches to saddle rails 204a and 204b. Stabilizer bar 139, extending from central stem 121, presses against the bottom 22 of saddle 20. Stabilizer bar 139 is attached to central stem 121 with a rigid arm 141 positioned and configured to provide an upward force against the bottom side 22 of saddle 20.

Although the invention has been described with reference to specific embodiments, this description is not meant to be construed in a limiting sense. Various modifications of the disclosed embodiments, as well as alternative embodiments of the inventions, will be apparent to persons skilled in the art upon reference to the description of the invention. It is, therefore, contemplated that the appended claims will cover such modifications that fall within the scope of the invention.

The invention claimed is:

1. A removable saddle bag assembly for a bicycle saddle with saddle rails, the removable saddle bag assembly comprising:
   a saddle bag frame with a central stem configured to fit between the saddle rails;
   first and second attachment means connected to the central stem and configured to engage the saddle rails on opposite sides of the saddle rails from the central stem;
   first and second support arms connected to the central stem and extending generally rearwardly therefrom, wherein the first and second support arms are semi-rigid;
   a saddle bag shell substantially surrounding the central stem and support arms and defining a storage cavity;
   a selectively closable access port defined in the saddle bag shell wherein at least one of the first and second attachment means further comprises a rail engagement spring configured to provide an upward force against the saddle rails when attached to a saddle.

2. The removable saddle bag assembly of claim 1 wherein the first and second attachment means each comprise a rail engagement spring configured to provide an upward force against the saddle rails when attached to a saddle.

3. The removable saddle bag assembly of claim 1 further comprising a stabilizer bar extending upwardly and forwardly from the central stem and configured to contact a bottom surface of the saddle when the saddle bag assembly is attached to a saddle.

4. The removable saddle bag assembly of claim 1 further comprising an accessory port defined in the central stem, wherein the accessory port is configured to engage an accessory tab and comprises a latch mechanism to selectively secure or release the accessory tab.

5. A saddle bag for a bicycle saddle with saddle rails, the saddle bag comprising:
   a saddle bag frame comprising
      a front channel defined by a left sidewall and a right sidewall connected to the left sidewall, wherein the left sidewall is positioned sufficiently close to the right sidewall to allow the front channel to fit between at least a portion of the saddle rails; and
      a shell support member extending rearwardly from the front channel; wherein the upper, forward, rearward, left and right dimensions of the shell support member substantially conform to the desired respective dimensions of the saddle bag;

a left rail engagement member comprising: a rail engagement body with an upper end and a lower end, a rail engagement prong extending from the upper end of the rail engagement body toward the left sidewall, and a rail engagement biasing member attached to the rail engagement body at a location between the upper end and the lower end of the rail engagement body and connecting the rail engagement body to the left sidewall; wherein the rail engagement biasing member is configured to impart a force biasing the rail engagement prong toward the left sidewall unless a countervailing force is applied to the lower end of the rail engagement body;

a right rail engagement member comprising: a rail engagement body with an upper end and a lower end, a rail engagement prong extending from the upper end of the rail engagement body toward the right sidewall, and a rail engagement biasing member attached to the rail engagement body at a location between the upper end and the lower end of the rail engagement body and connecting the rail engagement body to the right sidewall; wherein the rail engagement biasing member is configured to impart a force biasing the rail engagement prong toward the right sidewall unless a countervailing force is applied to the lower end of the rail engagement body;

a shell configured to substantially surround the front channel and the shell support member and to define and enclose a storage space; and a selectably closable access port defined in the shell wherein at least one of the left and right rail engagement members further comprises a rail engagement spring configured to provide an upward force against the saddle rails when attached to a saddle.

6. The saddle bag of claim 5 further comprising a front cover with a first end, a second end, and a central panel between the first end and the second end, wherein the first end is selectively attachable to a portion of the shell adjacent the left sidewall, the second end is selectively attachable to a portion of the shell adjacent the right sidewall, and the central panel is configured to extend around a forward end of the front channel.

7. The saddle bag of claim 5 wherein the shell support member comprises a generally-planar rigid platform with a shape conforming to a desired horizontal shape of the storage space.

8. The saddle bag of claim 5 wherein the shell support member comprises a left frame arm and a right frame arm, and wherein the outside horizontal dimensions of the left frame arm and the right frame arm conform to a desired horizontal shape of the storage space.

9. The saddle bag of claim 8 further comprising a left latch mechanism defined on a rearward end of the left frame arm and a right latch mechanism defined on a rearward end of the right frame arm and wherein the left latch mechanism and the right latch mechanism are configured to engage each other to hold the respective rearward ends of the left frame arm and the right frame arm together.

* * * * *